May 3, 1938. J. W. HASSELKUS ET AL 2,116,264
OBJECTIVE SUITABLE FOR PHOTOGRAPHIC PURPOSES
Filed June 8, 1937
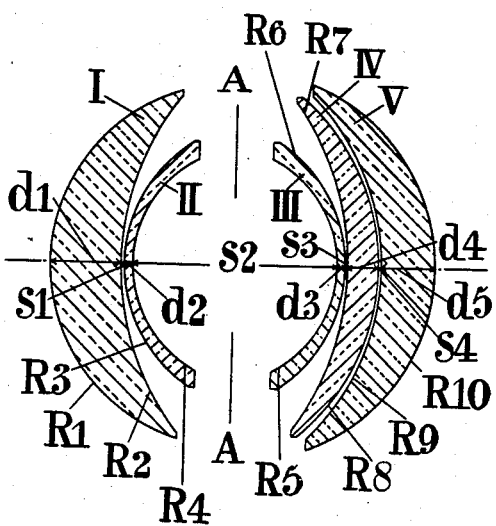
J. W. Hasselkus
G. A. Richmond
INVENTORS
By: Glascock Downing
Attys.

UNITED STATES PATENT OFFICE 2,116,264

OBJECTIVE SUITABLE FOR PHOTOGRAPHIC PURPOSES

John William Hasselkus and George Arthur Richmond, Clapham, London, England

Application June 8, 1937, Serial No. 147,102
In Great Britain June 9, 1936

1 Claim. (Cl. 88—57)

The invention relates to objectives suitable for photographic purposes and especially to wide-angle objectives of the kind in which a pair of meniscal lenses, one of which is negative and the other positive, are disposed on one side of a diaphragm, and another pair consisting of a negative and positive meniscal lens on the other side, the concave sides of all the lenses being disposed towards the diaphragm while each negative lens is closer to the diaphragm than its associated positive lens.

Such an objective is described in British patent specification, No. 423,156 with the addition according to one proposed form of at least one exterior lens having radii of curvature greater than the focal length of the objective.

The main object of the present invention is to obtain a field of view of approximately 100° with a relative aperture of about F/5.6 in an objective of the above type, with good correction for spherical aberration, distortion and astigmatism.

The present invention consists in an objective lens system as set forth in the claim appended hereto.

In carrying the invention into effect according to one form, as shown in the accompanying figure, the combination of lenses on the left-hand side of the diaphragm comprises in order from left to right a positive meniscal lens, I, with its concavity disposed towards the diaphragm, A, and a negative meniscal lens, II, with its convex surface in proximity to the concave surface of the positive lens. On the right-hand side of the diaphragm, continuing from left to right, are disposed first a negative meniscal lens, III, with its concavity towards the diaphragm and two positive meniscal lenses, IV and V, with their concavities towards the diaphragm.

All the lenses have a common axis of symmetry.

The negative lenses, II and III, on the two sides of the diaphragm have approximately the same radii of curvature while the power of the single positive lens, I, on the left-hand side of the diaphragm is greater than that of either of the two positive elements, IV, V, on the right-hand side of the diaphragm.

All radii of curvature of the different lens surfaces are less than the focal length of the combination.

The following numerical values in millimeters for the radii of curvature of the different lenses are appended, by way of example only, for an objective having a focal length of 194.5:—

| Lens | Radii of surfaces | Thickness and separations |
|---|---|---|
| I | $R_1 = 36.15$ m/m $R_2 = 54.15$ m/m | $d_1 = 14.33$ m/m |
|   |   | $s_1 = 0.06$ m/m |
| II | $R_3 = 29.45$ m/m $R_4 = 23.75$ m/m | $d_2 = 1.61$ m/m |
|   |   | $s_2 = 40.56$ m/m |
| III | $R_5 = 23.75$ m/m $R_6 = 29.45$ m/m | $d_3 = 1.61$ m/m |
|   |   | $s_3 = 0.06$ m/m |
| IV | $R_7 = 55.65$ m/m $R_8 = 44.05$ m/m | $d_4 = 6.20$ m/m |
|   |   | $s_4 = 0.06$ m/m |
| V | $R_9 = 47.90$ m/m $R_{10} = 38.95$ m/m | $d_5 = 10.70$ m/m |

Glasses

|  | $N_d$ | $N_g$ | $v$ |
|---|---|---|---|
| I, IV, V | 1.6202 | 1.6329 | 60.4 |
| II, III | 1.7174 | 1.7492 | 29.5 |

The addition of a deep positive meniscal lens to the four-lens system enables an objective to be provided corrected as a unit for all the aberrations including distortion and astigmatism, while at the same time not only can the lens system be more fully corrected for spherical aberration and coma, but by virtue of its power, the aperture can be increased to F/5.6.

We claim:

An objective lens system comprising two groups of positive and negative meniscal lenses axially spaced apart symmetrically on each side of the diaphragm, the concave surfaces of each lens element facing toward the diaphragm, the positive meniscal lenses being positioned on the outside of the two negative meniscal lenses positioned adjacent the diaphragm, the pair of lenses facing the incident light comprising a positive meniscal lens and a negative meniscal lens axially spaced apart a small fraction of the focal length of the objective as a whole, the group of lenses on the image side of the diaphragm comprising a negative meniscal lens and two positive meniscal lens elements spaced apart a small fraction of the focal length of the objective as a whole, and the two groups of lenses being axially spaced apart on each side of the diaphragm a distance such that the exterior positive meniscal lenses are substantially portions of a bounding spherical surface or are formed from substantially the same centre of curvature, whereby the desired corrections and wide angle of field may be obtained.

JOHN WILLIAM HASSELKUS.
GEORGE ARTHUR RICHMOND.